US011301945B2

(12) United States Patent
Terra et al.

(10) Patent No.: US 11,301,945 B2
(45) Date of Patent: Apr. 12, 2022

(54) RECRUITING AND ADMISSION SYSTEM

(71) Applicant: Oracle International Corporation, Redwood Shores, CA (US)

(72) Inventors: Egidio Loch Terra, San Mateo, CA (US); James Thomas McKendree, Elizabeth, CO (US); Vivian Wei Wong, Danville, CA (US); Catherine H. M. Kuo, Danville, CA (US); Paz Centeno, Delray Beach, FL (US); Boonchanh Oupaxay, Mountain House, CA (US); Gary Paul Allen, Petaluma, CA (US); Rondy C. Ng, Redwood Shores, CA (US); Susan Jane Beidler, Oakland, CA (US); David Anthony Madril, Denver, CO (US); Richard Lee Krenek, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 15/915,361

(22) Filed: Mar. 8, 2018

(65) Prior Publication Data

US 2019/0102854 A1    Apr. 4, 2019

Related U.S. Application Data

(60) Provisional application No. 62/566,408, filed on Sep. 30, 2017.

(51) Int. Cl.
*G06Q 50/20* (2012.01)
*G06N 20/00* (2019.01)
(Continued)

(52) U.S. Cl.
CPC ....... *G06Q 50/2053* (2013.01); *G06F 16/248* (2019.01); *G06F 16/9535* (2019.01);
(Continued)

(58) Field of Classification Search
CPC ... G06Q 50/205; G06Q 50/20; G06Q 50/2053
(Continued)

(56) References Cited

U.S. PATENT DOCUMENTS

| 5,727,950 A | 3/1998 | Cook et al. |
| 6,347,333 B2 | 2/2002 | Eisendrath et al. |

(Continued)

FOREIGN PATENT DOCUMENTS

| WO | 97/44766 A1 | 11/1997 |
| WO | 01/82150 A2 | 11/2001 |

(Continued)

OTHER PUBLICATIONS

Maryalene LaPonsie, "The High School Student's Guide College Admissions", retrieved from https://web.archive.org/web/20161013154233/https://www.accreditedschoolsonline.org/resources/college-admissions-guide/; www.accreditedschoolsonline.org (Year: 2016).*

(Continued)

*Primary Examiner* — Sangeeta Bahl
*Assistant Examiner* — Joshua D Schneider
(74) *Attorney, Agent, or Firm* — Invoke

(57) ABSTRACT

Operations include aggregating, analyzing, and displaying information about prospects for an educational institution. The system may aggregate prospect information by traversing, for example, lower education databases, social networking websites, or testing organization databases. The system may evaluate prospects which are potential applicants to generate recommendations for contact by a recruiter. Alternatively, or additionally, the system may evaluate prospects which have applied for admission to the institution to generate recommendations for acceptance by an admission officer. The system may recommend a prospect based on the prospect's potential for success in the institution. Success (Continued)

may correspond to metrics such as a likelihood of graduating from the educational institution or a likelihood of obtaining employment subsequent to graduating from the institution. Prospects sharing attributes with previously successful students may be selected for recommendation. Prospects which do not share attributes with previously successful students may not be selected for recommendation.

15 Claims, 8 Drawing Sheets

(51) Int. Cl.
    G06F 16/248    (2019.01)
    G06N 5/04    (2006.01)
    G06F 16/9535    (2019.01)
    G06N 7/00    (2006.01)

(52) U.S. Cl.
    CPC ............. *G06N 5/046* (2013.01); *G06N 7/005* (2013.01); *G06N 20/00* (2019.01)

(58) Field of Classification Search
    USPC ........................................................ 705/327
    See application file for complete search history.

(56) References Cited

U.S. PATENT DOCUMENTS

| | | |
|---|---|---|
| 6,427,063 B1 | 7/2002 | Cook et al. |
| 7,882,041 B2 | 2/2011 | Gibbons et al. |
| 8,412,736 B1 | 4/2013 | Arnold et al. |
| 8,620,831 B1 | 12/2013 | Adams |
| 8,764,454 B1 | 7/2014 | Turner |
| 9,299,266 B2 | 3/2016 | Crawford et al. |
| 9,824,603 B2 | 11/2017 | Brooke et al. |
| 9,940,606 B2 | 4/2018 | Madhavan et al. |
| 10,229,100 B1 | 3/2019 | Lesner et al. |
| 10,607,298 B1 | 3/2020 | Hanekamp et al. |
| 2004/0009462 A1 | 1/2004 | McElwrath |
| 2004/0138913 A1 | 7/2004 | Guerra |
| 2004/0161728 A1 | 8/2004 | Benevento et al. |
| 2004/0167786 A1 | 8/2004 | Grace |
| 2004/0181749 A1 | 9/2004 | Chellapilla et al. |
| 2005/0198563 A1 | 9/2005 | Kristjansson |
| 2006/0069576 A1 | 3/2006 | Waldorf et al. |
| 2006/0252021 A1 | 11/2006 | Watkins et al. |
| 2006/0265258 A1* | 11/2006 | Powell ................... G06Q 10/10 705/327 |
| 2009/0035733 A1 | 2/2009 | Meitar et al. |
| 2009/0081629 A1 | 3/2009 | Billmyer et al. |
| 2009/0083638 A1 | 3/2009 | Gupta |
| 2009/0197234 A1 | 8/2009 | Creamer et al. |
| 2010/0009330 A1 | 1/2010 | Yaskin |
| 2010/0009331 A1 | 1/2010 | Yaskin et al. |
| 2010/0009332 A1 | 1/2010 | Yaskin et al. |
| 2010/0159438 A1 | 6/2010 | German et al. |
| 2010/0223194 A1 | 9/2010 | Adams |
| 2011/0270684 A1 | 11/2011 | Holtzman |
| 2012/0233083 A1 | 9/2012 | Strodtman et al. |
| 2012/0233084 A1 | 9/2012 | Sardonis et al. |
| 2012/0233108 A1 | 9/2012 | Stober et al. |
| 2013/0011821 A1 | 1/2013 | Denley |
| 2014/0052663 A1* | 2/2014 | Kelley ................ G06Q 30/0282 705/347 |
| 2014/0074896 A1 | 3/2014 | Bushman et al. |
| 2014/0188442 A1 | 7/2014 | Zelenka et al. |
| 2014/0195549 A1 | 7/2014 | Ahn et al. |
| 2014/0205987 A1 | 7/2014 | Habermehl et al. |
| 2014/0279620 A1* | 9/2014 | Lillquist ............ G06Q 50/2053 705/319 |
| 2014/0379602 A1 | 12/2014 | Nelson et al. |
| 2015/0066559 A1 | 3/2015 | Brouwer |
| 2015/0134556 A1* | 5/2015 | Spinner .............. G06Q 30/0279 705/329 |
| 2015/0149379 A1* | 5/2015 | Dearmon ............... G06Q 10/00 705/326 |
| 2015/0149380 A1 | 5/2015 | Kulkarni et al. |
| 2015/0205777 A1 | 7/2015 | Campanelli et al. |
| 2015/0220880 A1 | 8/2015 | Maipady et al. |
| 2015/0248739 A1 | 9/2015 | Schulman et al. |
| 2015/0317604 A1 | 11/2015 | Bubna et al. |
| 2016/0071424 A1 | 3/2016 | Harney et al. |
| 2016/0085754 A1 | 3/2016 | Gifford et al. |
| 2016/0140679 A1 | 5/2016 | Segal et al. |
| 2016/0275634 A1* | 9/2016 | Singh ................. G06Q 50/2053 |
| 2016/0371805 A1* | 12/2016 | Knotts .................. G06F 16/211 |
| 2017/0004453 A1 | 1/2017 | Lin et al. |
| 2017/0154308 A1 | 6/2017 | Duerr et al. |
| 2017/0256172 A1 | 9/2017 | Kil et al. |
| 2017/0316528 A1 | 11/2017 | Willcox et al. |
| 2017/0365023 A1* | 12/2017 | Cox ....................... G06Q 30/02 |
| 2018/0052919 A1 | 2/2018 | Feldman |
| 2018/0130155 A1 | 5/2018 | Oni et al. |
| 2018/0189911 A1* | 7/2018 | Al-Sulaiman .......... G06Q 10/10 |
| 2018/0276205 A1 | 9/2018 | Auger |
| 2018/0293679 A1* | 10/2018 | Bai ....................... G06Q 10/10 |
| 2018/0293905 A1 | 10/2018 | Benz |
| 2018/0350016 A1 | 12/2018 | Ward |
| 2018/0366021 A1 | 12/2018 | Zertuche |
| 2019/0080628 A1 | 3/2019 | Olsen |

FOREIGN PATENT DOCUMENTS

| | | |
|---|---|---|
| WO | 2003/100560 A2 | 12/2003 |
| WO | 2004/023329 A1 | 3/2004 |
| WO | 2013/066868 A1 | 5/2013 |

OTHER PUBLICATIONS

Hurwitz, "The impact of legacy status on undergraduate admissions at elite colleges and universities", 2009, retrieved from https://scholar.harvard.edu/files/btl/files/michael_hurwitz_-_qp_12-12-09.pdf (Year: 2009).*

Waters et al., "GRADE: Machine Learning Support for Graduate Admissions", 2013, Proceedings of the Twenty-Fifth Innovative Applications of Artificial Intelligence Conference (Year: 2013).*

Thomas Lux, et al., "Applications of Supervised Learning Techniques on Undergraduate Admissions Data", 2016, retrieved from https://dl.acm.org/doi/pdf/10.1145/2903150.2911717 (Year: 2016).*

Tristan Denley, Degree Compass: A Course Recommendation System, EDUCASE, Nov. 23, 2017.

Grewal DS, Kaur K (2016) Developing an Intelligent Recommendation System for Course Selection by Students for Graduate Courses. Bus Eco J 7:209. doi:10.4172/2151-6219.1000209.

Even your academic advisor might one day be a robot, retrieved from https://www.engadget.com/2016/01/14/your-academic-advisor-might-one-day-be-a-robot/.

Chatbot helps students choose courses, retrieved from http://www.bbc.com/news/technology-40960426.

Al-Badarenah and Alsakran, An Automated Recommender System for Course Selection, International Journal of Advanced Computer Science and Applications, vol. 7, No. 3, pp. 166-175, 2016.

Murtaugh, Paul A., Leslie D. Burns, and Jill Schuster. "Predicting the retention of university students." Research in higher education 40.3 (1999): 355-371. (Year: 1999).

Tsai et al., "Ontology-Mediated Integration of Intranet Web Services," Computer, p. 63-71, copyright 2003 IEEE. (Year: 2003).

Aguiar, E., Identifying students at risk and beyond: A machine learning approach (Order No. 3733723). Available from ProQuest Dissertations and Theses Professional. (1749024112), Jul. 2015. (Year: 2015).

Aasheim et al., Knowledge and skill requirement for entry level IT workers, Journal of Information Systems Education, vol. 20(3), pp. 349-356 (Year: 2009).

Burke, Hybrid Recommender Systems: Survey and Experiments User Modeling and User-Adapted Interaction, 2002, pp. 1-30 (Year: 2002).

(56) References Cited

OTHER PUBLICATIONS

De Pessemier, Social Recommendations for Events, Ghent University, 2013, pp. 1-4 (Year: 2013).
Herzog, Spontaneous Event Recommendations on the Go, DMRS, 2015, pp. 1-4 (Year: 2015).
Wang, Enhanced Group Recommender System and Visualization, Doctoral Thesis, University of Technology Sydney, 2016, pp. 1-190 (Year: 2016).
Aher, Sunita B., and L. M. R. J. Lobo. "Combination of machine learning algorithms for recommendation of courses in E-Learning System based on historical data." Knowledge-Based Systems 51 (2013): 1-14. (Year: 2013).
Brzozowski, Mike, etal. "groupTime: preference based group scheduling." Proceedings of the SIGCHI conference on Human Factors in computing systems. 2006. (Year: 2006).
Liao, Soohyun Nam, et al. "A robust machine learning technique to predict low-performing students." ACM Transactions on Computing Education (TOCE) 19.3 (2019): 1-19. (Year: 2019).
Wang, Yen-Zen. "Using genetic algorithm methods to solve course scheduling problems." Expert Systems with Applications 25.1 (2003): 39-50. (Year: 2003).

\* cited by examiner

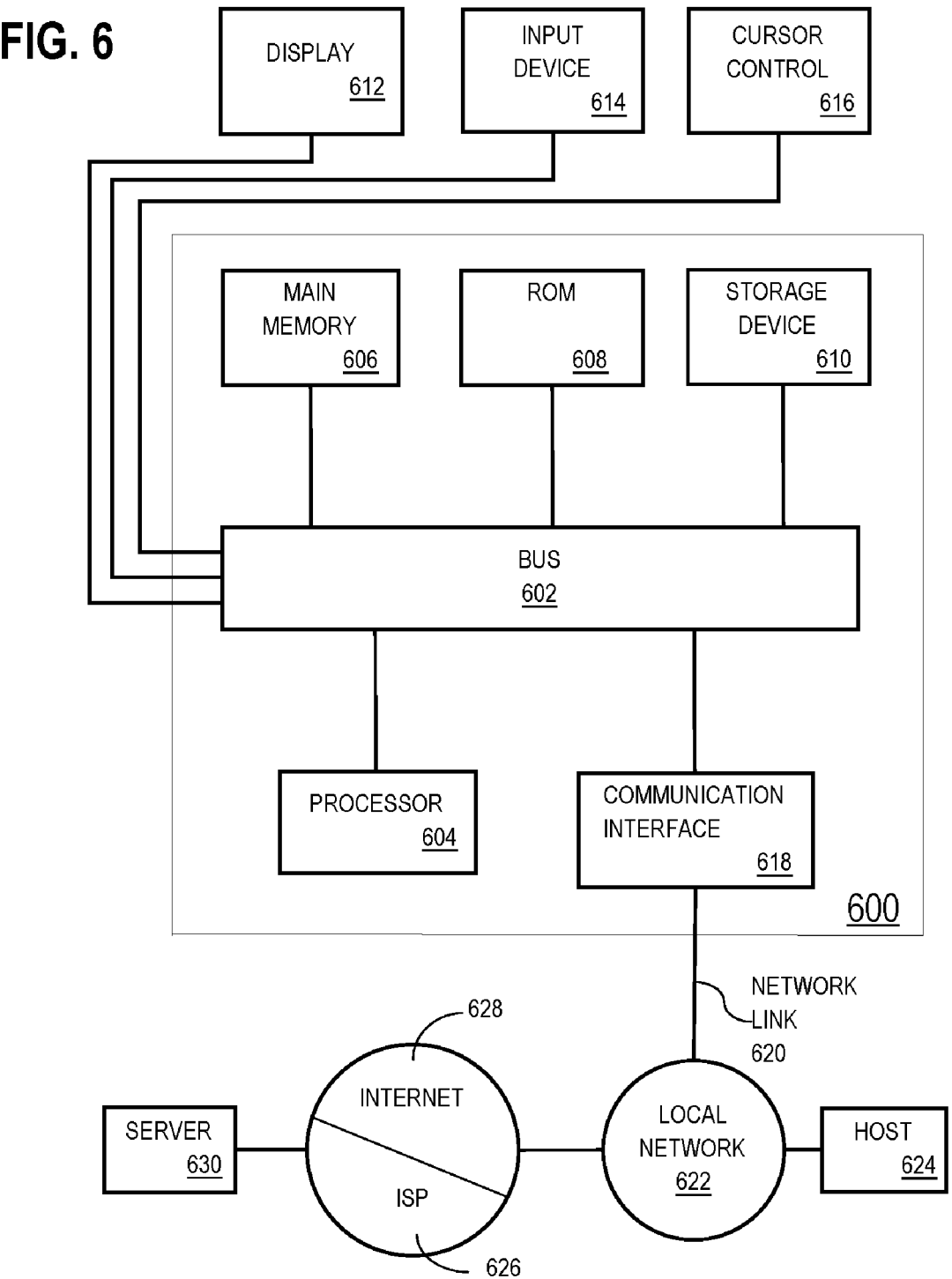

RECRUITING AND ADMISSION SYSTEM

BENEFIT CLAIM; RELATED APPLICATION; INCORPORATION BY REFERENCE

This application claims the benefit of U.S. Provisional Patent Application No. 62/566,408, filed Sep. 30, 2017, which is hereby incorporated by reference.

TECHNICAL FIELD

The present disclosure relates to recruiting and admitting students to an educational institution. In particular, the present disclosure relates to a recruiting and admission system that helps manage prospects for an educational institution.

BACKGROUND

Higher education institutions, such as universities and colleges used interchangeably herein, recruit and evaluate prospects for admission on a continual basis. Recruiting and evaluating prospects for admission is often a labor-intensive, manual, cumbersome process. Furthermore, a college may spend a significant amount of time and money marketing to a multitude of prospects. However, many of the prospects targeted by the college may be unqualified or uninterested in attending the college.

Students that enroll in a college may drop out or transfer to another college. Students dropping out or transferring away results in a lower graduation rate for the college. Students dropping out or transferring away results in a decrease in tuition revenue for the college.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments.

DETAILED DESCRIPTION

Figure 1:
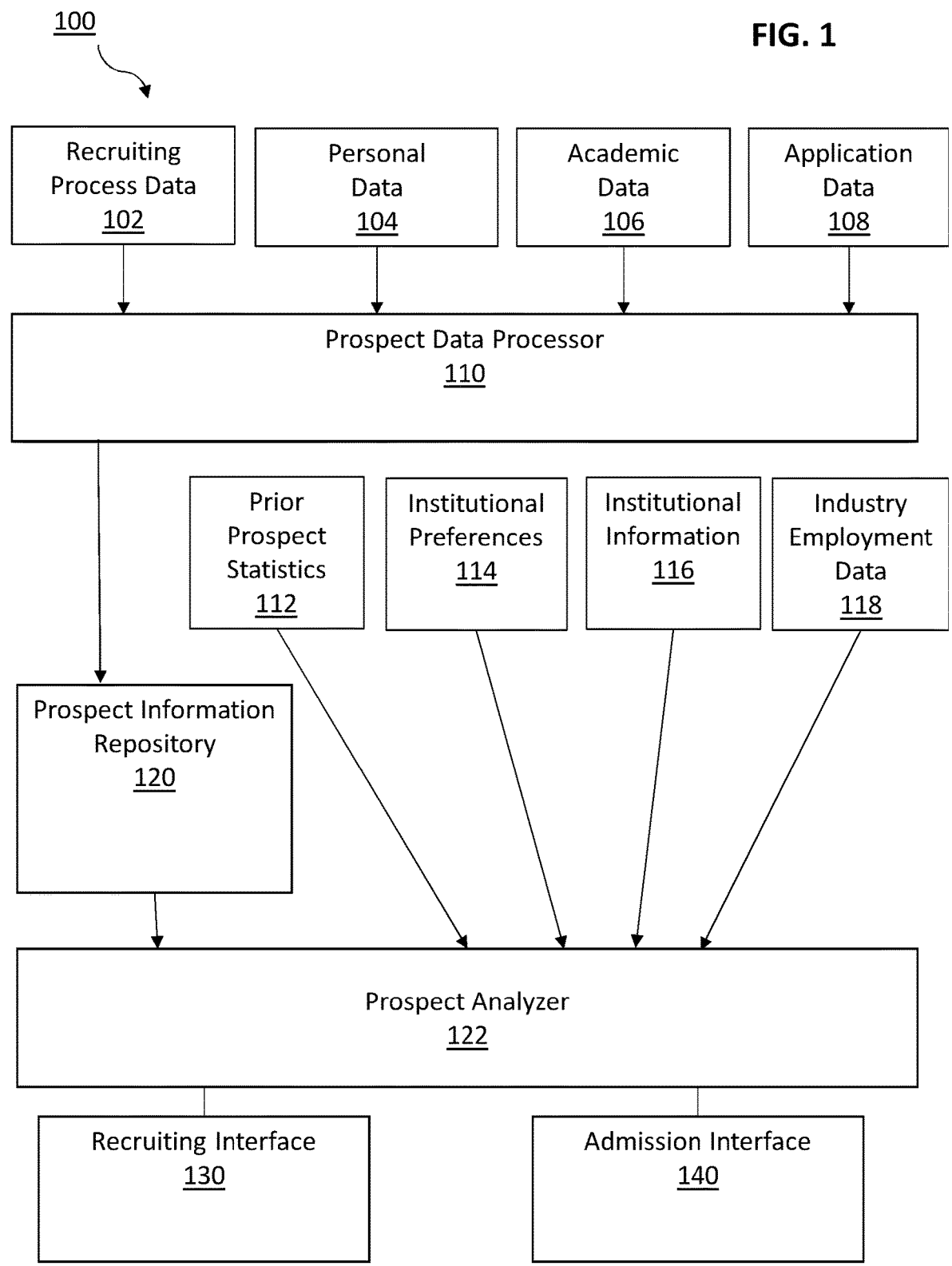
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RECRUITING AND ADMISSION SYSTEM
3. ADAPTIVE RECRUITING INTERFACE
4. ADAPTIVE ADMISSION INTERFACE
5. IDENTIFYING AND PRESENTING PROSPECTS
6. MISCELLANEOUS; EXTENSIONS
7. HARDWARE OVERVIEW

1. General Overview

Some embodiments include a recruiting and admission system, also referred to herein as a prospect management system. The prospect management system aggregates and displays information about prospects for a higher education institution. Prospects that have not initiated an application process for applying to the higher education institution may be referred to herein as pre-application prospects. Prospects that have initiated an application process for applying to the higher education institution may be referred to herein as applicants.

In one or more embodiments, the prospect management system collects and analyzes prospect data using a prospect data processor and a prospect analyzer. A prospect data processor may aggregate prospect information by traversing, for example, lower education databases, social networking websites, testing organization databases, or athlete management databases to identify prospects. A prospect analyzer may evaluate the prospects to generate recommendations for contact by a recruiter. The prospect analyzer may evaluate the prospects to generate recommendations admit or not admit a prospect to a higher education institution. The prospect analyzer may recommend prospects which (a) share attributes with previously successful students, (b) match institutional preferences, or (c) have interests that match industry needs. The prospect analyzer may generate recommendations based on a likelihood of a prospect enrolling in the educational institution. As an example, prospects with siblings that have enrolled in the higher educational institution may be recommended for contact by recruiters. The prospect analyzer may recommend a prospect based on the prospect's potential for success in a particular educational institution. Success may correspond to a likelihood of graduating from the institution.

In an embodiment, a recruiting interface displays information and recommendations corresponding to pre-application prospects. The recruiting interface includes a prospect population view. The prospect population view may partition pre-application prospects into different categories. As an example, pre-application prospects may be categorized by grades, interests, or minority status. The recruiting interface may recommend a method of contact for contacting a pre-application prospect. As an example, the recruiting interface may identify a prospect's preferred communication medium such as messages via a social networking website, email communications, or phone calls.

In an embodiment, an admission interface displays information and recommendations regarding applicants for a higher education institution. In addition to the type of information displayed by the recruiting interface, the admission interface may display admission recommendations. The admission interface may be configured to receive input, from an admission officer, specifying whether a particular applicant is admitted or not admitted. The admission interface may be used to trigger processes such as generation of admission letters.

One or more embodiments described in this Specification and/or recited in the claims may not be included in this General Overview section.

2. Recruiting and Admission System

FIG. 1 illustrates a recruiting and admission system 100 in accordance with one or more embodiments. As illustrated in FIG. 1, the recruiting and admission system 100 includes a prospect data processor 110, a prospect information repository 120, a prospect analyzer 122, a recruiting interface 130, and an admission interface 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the recruiting and admission system 100 analyzes data corresponding to prospects for an educational institution. Prospects may include potential applicants to the educational institution, who have not yet initiated the application process (referred to herein as pre-applicant prospects). Prospects may further include applicants to an educational institution. Applicants include prospects who have submitted a complete application for admission to the educational institution. Applicants may further include prospects who have submitted components of the application but not the complete application.

In one or more embodiments, the prospect data processor 110 analyzes prospect data from various sources to identify prospects for a higher education institution. The prospect data analyzed by the prospect data processor 110 may include, but is not limited to, recruiting process data 102, personal data 104, academic data 106, and application data 108.

In one or more embodiments, recruiting process data 102 is data acquired in the recruiting process. Recruiting process data 102 may be data obtained via a university's recruiting efforts. As an example, recruiting process data 102 may include the name of a prospect, obtained when the student visited the university and talked with an admission officer or a recruiter. As another example, recruiting process data 102 may include a prospect's contact information collected by admission department personnel during a high school visit. Recruiting process data 102 may indicate a prospect's level of interest in the institution. The system may obtain recruiting process data 102 indicative of the prospect's level of interest via prospect interaction with a recruiter or recruiting email. The system may, explicitly or implicitly, obtain positive or negative feedback from the prospect interaction. As an example, a prospect opens a targeted email but does not follow up, explicitly indicating a lack of interest. As another example, a prospect clicks a link in a targeted email, explicitly indicating interest. As another example, a prospect does not open a targeted email, implicitly indicating a lack of interest.

In one or more embodiments, personal data 104 may include information about any activity performed by a prospect. Personal data 104 may implicitly reveal prospect interests based on activities performed by the prospect. As an example, personal data 104 may include browser history indicating that a prospect has visited the university's website. Personal data 104 may further include browser history indicating third-party websites that the prospect has visited. As another example, personal data 104 may include information about the prospect winning first place in an engineering competition. As another example, personal data 104 may include a social media post, made by the prospect, indicating an interest in sculpting. Personal data 104 may further include biodemographic data, such as a prospect's race which was self-reported in a survey. Personal data 104 may include prospect information obtained from a third-party database.

In one or more embodiments, academic data 106 includes records from a prospect's prior and/or current educational institutions. The academic data may be collected by a university from either the prospect, or from the prospect's current or prior educational institutions. As an example, the academic data 106 may include high school records for a prospect. The academic data 106 may include academic records from other higher-learning institutions. The academic data 106 may further include standardized test scores for the student.

In one or more embodiments, application data 108 may include information submitted by a prospect as a part of a formal application. Application data 108 may include test scores and/or grades self-reported by a prospect in an admission application. Application data 108 may include demographic information provided by a prospect in an admission application. Application data 108 may include an essay submitted by a prospect as part of an admission application. Application data 108 may include a letter of recommendation submitted by a teacher on behalf of a prospect as part of an admission application. Application data 108 may include interests specified in the application, such as housing interests and sports interests.

In an embodiment, the prospect data processor 110 derives, normalizes, and links prospect data. The prospect data processor 110 accumulates data from multiple sources and aggregates the data to the prospect information repository 120. The prospect data processor 110 may derive data. For example, the prospect data processor 110 determines a number of "A" grades received in high school by a prospect. The prospect data processor may convert data to a uniform format to facilitate comparison between prospects. For example, the prospect data processor 110 may convert Grade Point Averages (GPAs), from various sources and formats, to a "X.XX" format. The prospect data processor may normalize data. As an example, the prospect data processor may normalize GPAs received from domestic and international applicants to facilitate comparison of applicants from different countries. The prospect data processor may map data from different sources. As an example, a prospect's application for admission to Jones College lists two relatives as alumni of Jones College. The names of the alumni, in the application, are mapped to records, corresponding to the respective alumni, in the Jones College's record system. The prospect data processor may link data sets. As an example, the prospect data processor links a self-reported Scholastic Assessment Test (SAT) score to an official SAT score report.

In an embodiment, the prospect information repository 120 is any type of storage unit and/or device (e.g., a file system, collection of tables, or any other storage mechanism) for storing prospect information. Further, the prospect information repository 120 may include multiple different storage units and/or devices. The multiple different storage units and/or devices may or may not be of the same type or located at the same physical site. Further, prospect information repository 120 may be implemented or may execute on the same computing system as the prospect data processor 110, the prospect analyzer 122, the recruiting interface 130, and the admission interface 140. Alternatively, or additionally, the prospect information repository 120 may be implemented or executed on a computing system separate from the prospect data processor 110, the prospect analyzer 122, the recruiting interface 130, and the admission interface 140. The prospect information repository 120 may be communicatively coupled to the prospect data processor 110, the prospect analyzer 122, the recruiting interface 130, and the admission interface 140 via a direct connection or via a network.

The prospect information repository 120 may be connected with a social network, an Internet Service Provider, or an email service that may have access to a prospect's personal data 104. As noted above, the prospect's personal data 104 may include the student's entity affiliations, personal connections, browsing history, and past events attended. The system may obtain such personal data, possibly subject to the prospect's approval. The system may store the personal data in the prospect information repository 120.

As another example, an educational institution may have data-sharing relationships with the other institutions associated with the prospect. These other institutions may include educational or non-educational institutions with the prospect's information. The recruiting and admission system 100 may obtain data from these other institutions for admission analysis. The data may be stored in association with a prospect's profile in the prospect information repository 120.

In one or more embodiments, prior prospect statistics 112 include historical data about prior prospects. Prior prospects may include students that visited, applied to, enrolled in, and/or graduated from, the educational institution. The prior prospect statistics 112 may include which prior prospects were admitted, or not admitted, to the institution. The prior prospect statistics 112 may include which prior prospects applied, or did not apply, for admission to the institution. The prior prospect statistics 112 may include employment information for prospects. As an example, the institution may send surveys to alumni, requesting employment information. For the subset of alumni that provide employment information, the system stores prior prospect employment data. Additionally, or alternatively, the system may obtain employment data from third-party employment-related websites or databases. The prior prospect statistics 112 may include demographic information such as race, gender, and socioeconomic status. The prior prospect statistics 112 may include academic data such as high school grades, undergraduate grades, and standardized test scores.

In one or more embodiments, institutional preferences 114 specify programs and/or prospects upon which the educational institution prefers to focus resources. As an example, an institution may target high school students who have expressed an interest in Science, Technology, Engineering, and Math (STEM). An institution may seek to increase diversity by targeting students from a particular background which is underrepresented in the current population of the institution. Institutional preferences 114 may specify a particular program for which prospects are being recruited. The institution may use different parameters to choose medical students, law students, and undergraduate students.

In one or more embodiments, institutional information 116 includes information about the institution. The institutional information 116 may include programs currently available. As examples, programs available at a university may include: Bachelor of Arts (BA), Literature; Master of Science (MS), Engineering; Juris Doctorate (JD); and Doctor of Medicine (MD) degree programs. At a continuing education institution, programs may include a teaching credential and a real estate license. Institutional information may further include a number of openings available for new students. As an example, a college can admit 1,000 incoming freshmen a year.

In one or more embodiments, industry employment data 118 includes employment data about one or more industries. The industry employment data 118 may indicate majors or concentrations that tend to lead to employment. For example, the industry employment data may include statistics about percentages of college graduates that are employed, on a per-major basis (e.g., 90% of computer engineering majors and 60% of psychology majors are employed in the industry within 1 year of graduation).

In one or more embodiments, the prospect analyzer 122 includes hardware and/or software configured to analyze, categorize, and select information about prospects. The prospect analyzer 122 may obtain prospect data from the prospect information repository 120. Additionally, the prospect analyzer 122 may obtain prior prospect statistics 112, institutional preferences 114, institutional information 116, and/or industry employment data 118. The prospect analyzer may continually or periodically update information about a prospect such as, but not limited to, grades, stage of application process, a prospect's level of interest in the university, a prospect's location, and a prospect's finances.

In an embodiment, the prospect analyzer 122 analyzes data corresponding to prior prospects. The prospect analyzer 122 identifies attributes associated with prior prospects that succeeded at the educational institution. Success may be measured based on one or more metrics, depending on the set of prospects of interest. For applicants, the system may identify prior prospects which completed a goal such as graduating from a degree program or obtaining a professional certification. As examples, succeeding may be defined as graduating from the educational institution, obtaining employment after graduating, or graduating within a threshold time period (e.g., four years). For pre-application prospects, success metrics may relate to the application process.

As examples, succeeding may be defined as enrolling in, or being admitted to, the educational institution. The prospect analyzer may use multiple success metrics. As an example, the prospect analyzer may take into account both whether a prospect enrolled in, and whether the prospect graduated from, the educational institution.

In an embodiment, the prospect analyzer 122 compares attributes associated with prior prospects who have succeeded in the educational institution with attributes associated with a current prospect. Alternatively, or additionally, the prospect analyzer may identify and compare attributes associated with prior prospects who did not succeed in the educational institution. Based on the comparison between the current prospect and prior prospects, the prospect analyzer 122 determines a likelihood that the current prospect will succeed at the educational institution. The prospect analyzer 122 may compute a score indicating a current prospect's likelihood of success at the educational institution (also referred to herein as a "success score").

In an embodiment, the prospect analyzer 122 categorizes prospects. Information about a prospect may be used to assign the prospect to a category. For example, prospect information may be used to categorize prospects into one of following categories: (a) 0% to 30% of annual financial need funded, (b) 30% to 70% of annual financial need funded, and (c) 70% to 100% of annual financial need funded. The prospect analyzer 122 may categorize prospects based on institutional preferences. As an example, responsive to detecting user selection of the institutional preference "Major =Chemistry" the prospect analyzer identifies a subset of prospects pursuing a bachelor's degree in Chemistry.

In one or more embodiments, the prospect analyzer 122 selects data for presenting via the recruiting interface 130 and the admission interface 140. The prospect analyzer 122 may select data for presentation based on a prospect category. The prospect analyzer 122 may select data for presentation based on a likelihood of success corresponding to one or more prospects. The prospect analyzer 122 may select data for presentation based on input received from the admission interface 140 and/or the recruiting interface 130.

In one or more embodiments, the recruiting interface 130 displays information about pre-application prospects in aggregate or individual form. The recruiting interface 130 may obtain the prospect information from the prospect information repository 120 or from the prospect analyzer 122. The recruiting interface 130 may display information that can be viewed by an admission officer or recruiter to identify and communicate with prospects. The recruiting interface 130 may further include functionality to accept user commands for preparing and transmitting marketing materials, communications, and applications to prospects.

In an embodiment, the recruiting interface 130 may display information at various levels of granularity. A user can drill down into a set of information displayed by the recruiting interface 130 to identify further details. As an example (shown in FIG. 2A), the recruiting interface 130 may display prospect information at different levels of granularity in a pre-application prospect population view 202, a pre-application prospect category view 204, and an individual pre-application prospect view 206. A user may navigate may between the pre-application prospect population view 202, the pre-application prospect category view 204, and the individual pre-application prospect view 206.

In one or more embodiments, the admission interface 140 displays information about applicants in aggregate or individual form. The admission interface 140 may obtain the prospect information from the prospect information repository 120 or from the prospect analyzer 122. As an example, the admission interface 140 may display information that can be viewed by an admission officer to identify applicants to admit. The admission interface 140 may further include functionality to accept user commands for preparing and transmitting letters of acceptance, letters of rejection, or financial aid offers to prospects.

In an embodiment, the admission interface 140 may display information at various levels of granularity. A user can drill down into a set of information displayed by the admission interface 140 to identify further details. As an example (shown in FIG. 3A), the admission interface 140 may display prospect information at different levels of granularity in an applicant population view 302, an applicant category view 304, and an individual applicant view 306. A user may navigate may between the applicant population view 302, the applicant category view 304, and the individual applicant view 306.

Different components of the recruiting interface 130 and admission interface 140 may be specified in different languages. The behavior of user interface elements is specified in a dynamic programming language, such as JavaScript. The content of user interface elements is specified in a markup language, such as hypertext markup language (HTML) or extensible markup language (XML) User Interface Language (XUL). The layout of user interface elements is specified in a style sheet language, such as Cascading Style Sheets (CSS). Alternatively, recruiting interface 130 and admission interface 140 are specified in one or more other languages, such as Java, C, or C++.

The recruiting interface 130 and admission interface 140 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a mobile handset, a smartphone, a personal digital assistant ("PDA"), and/or a client device.

3. Adaptive Recruiting Interface

FIGS. 2A-2D illustrate examples of a recruiting interface 130 in accordance with one or more embodiments. The recruiting interface 130 may be an adaptive recruiting interface. An adaptive recruiting interface is periodically or continuously adapted based on statistics about prior prospects that succeeded or did not succeed in the higher education institution. The recruiting interface 130 may display user-selected categories to separate pre-application prospects based on a likelihood of success, as estimated from statistics corresponding to prior prospects. Presentation of categories based on a likelihood of success allows for recruiters to focus on prospects that are most likely to succeed in the university.

Figure 2A:
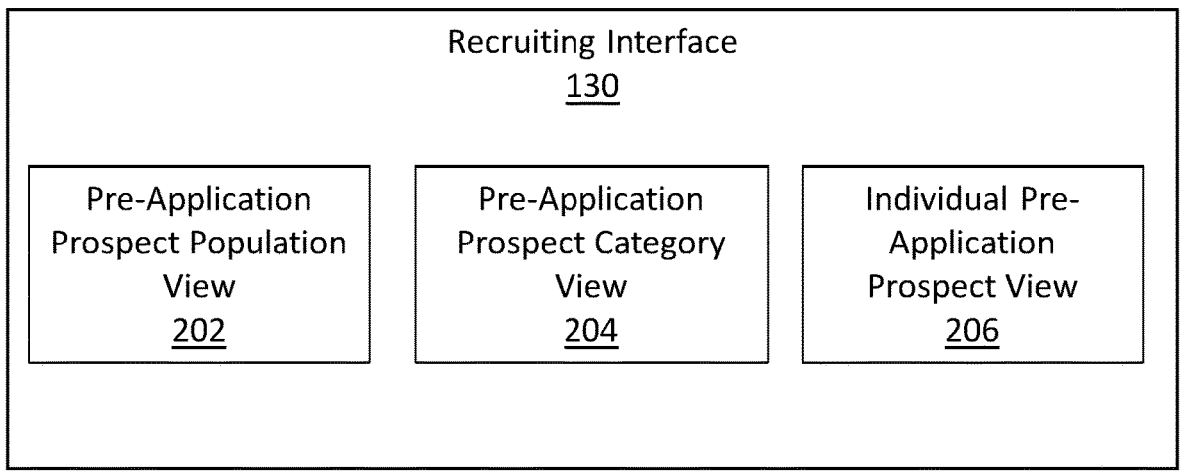
FIG. 2A illustrates a recruiting interface in accordance with one or more embodiments.

As illustrated in FIG. 2A, the recruiting interface 130 includes a pre-application prospect population view 202, a pre-application prospect category view 204, and an individual pre-application prospect view 206. The recruiting interface 130 may switch views, responsive to user input, to allow a user to drill down into statistics about a selected group of prospects.

A. Pre-Application Prospect Population View

Figure 2B:
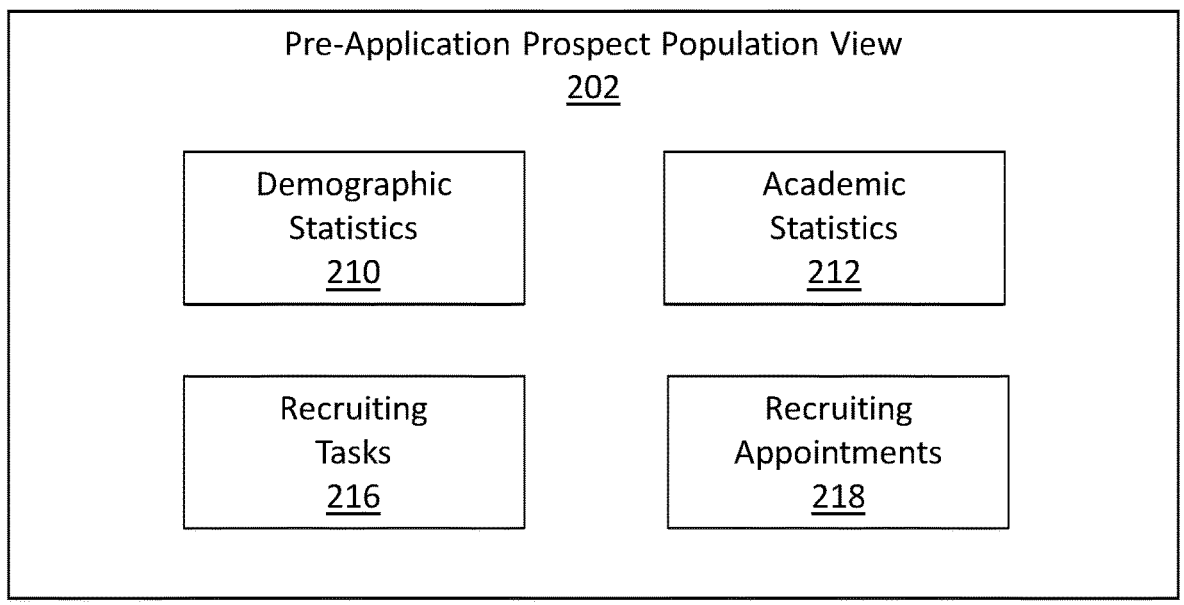
FIG. 2B illustrates a pre-application prospect population view of a recruiting interface in accordance with one or more embodiments.

As illustrated in FIG. 2B, a pre-application prospect population view 202 may include, for example, a display of aggregate information corresponding to prospects for which data is available in the prospect information repository. The aggregate information may include aggregate prospect information associated with each of a set of prospects. The pre-application prospect population view 202 may display information about an institution as a whole. As an example, the pre-application prospect population view 202 may display trends across years such as an average incoming GPA, average age, or residence locations of prospects who enrolled in the educational institution in prior years.

The pre-application prospect population view 202 of the recruiting interface 130 may display statistics including demographic statistics 210 and academic statistics 212. The pre-application prospect population view 202 may display categories of pre-application prospects corresponding to the statistics. As an example, the pre-application prospect population view 202 may display three prospect categories: (a) in-state prospects that are in a same state as the university, (b) out-of-state prospects that are in a different state than the university, and (c) international prospects that are in a different country than the university. Each category displayed by in the pre-application prospect population view 202 may be configured for user selection. As an example, a user clicks on a button labeled "International Prospects." The interface transitions to a pre-application prospect category view 204 to display additional information about prospects in the international category.

The pre-application prospect population view 202 may present categories which are recommended for viewing in a separate format or in a separate portion of the interface. For example, the prospect selection engine determines that students participating in a 4-H club are likely to succeed in veterinary science. Accordingly, the pre-application prospect population view 202 displays a link labeled "Interests: 4H" in a "Recommended" section of the pre-application prospect population view 202.

Additionally, or alternatively, the pre-application prospect population view 202 may display detailed information based on the statistics. As an example, when hovering over a button labeled "International Prospects," the interface displays a modal reading "350 international prospects identified."

In an embodiment, the demographic statistics 210 are statistics about a prospect's background. Demographic statistics may include race, age, and gender. Demographic statistics may include socioeconomic status (e.g., parent or student income). Demographic statistics may include geographic statistics (e.g., in-state or out-of-state).

In an embodiment, the academic statistics 212 are statistics pertaining to grades, test scores, or other measures of academic performance. The academic statistics 212 may include averages, totals, and/or percentages, derived by the prospect analyzer based on prospect information. As an example, the pre-application prospect population view 202 may display Grade Point Averages (GPAs) representing the $10^{th}$ percentile (e.g., 2.0), $50^{th}$ percentile (e.g., 3.2) and $90^{th}$ percentile (e.g. 3.9) of the population of current pre-application prospects.

In an embodiment, the recruiting tasks 216 are activities to be performed by a user regarding one or more pre-application prospects. The tasks may be action items for a recruiter. The tasks 216 may include mailing recruiting materials to prospects and corresponding with high school advisors.

In an embodiment, the recruiting appointments 218 are upcoming appointments for a user regarding one or more pre-application prospects. As an example, the pre-application prospect population view 202 may display upcoming appointments for an admission counselor. The listed appointments may be integrated with links to methods of communication. An appointment with Chris Sanchez may be illustrated with a time of the appointment, a type of the appointment, a link to message Chris, and a link to Chris' detailed profile.

B. Pre-Application Prospect Category View

Figure 2C:
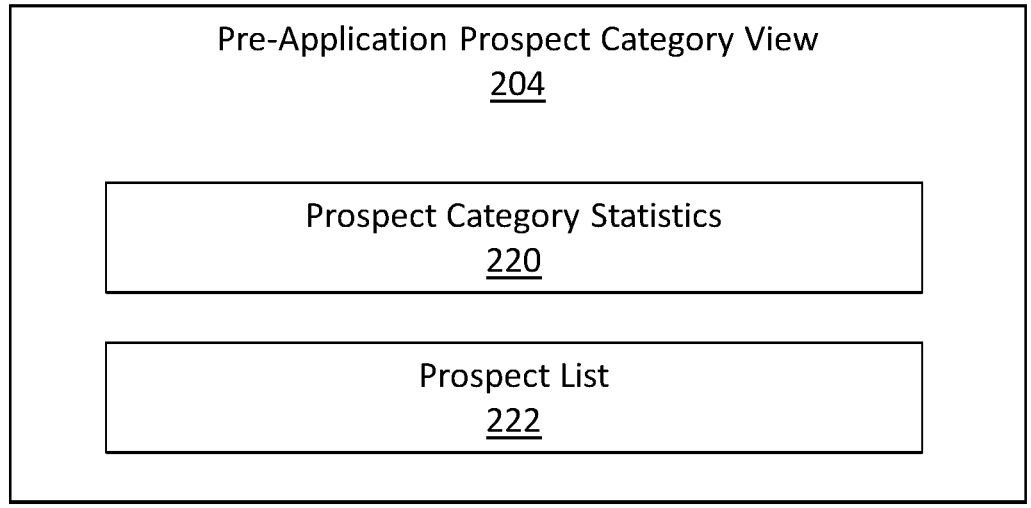
FIG. 2C illustrates a pre-application prospect category view of a recruiting interface in accordance with one or more embodiments.

Responsive to user input selecting a prospect category via the pre-application prospect population view 202, the recruiting interface 130 may present a pre-application prospect category view 204 as illustrated in FIG. 2C.

The pre-application prospect category view 204 may display a prospect list 222. A prospect list 222 is a list of prospects corresponding to one or more categories. As an example, responsive to user selection of the prospect category "Ethnicity=Native American," the system displays a list of 45 identified prospects which are known to be Native American. As another example, the prospect category view 204 may display a prospect list 222 corresponding to the prospects' likelihood of success (e.g. prospects determined likely to apply, be admitted, be accepted, or enroll). The pre-application prospect category view 204 may further divide a subset of prospects into groups. As an example, a subset of prospects with GPAs between 3.0 and 3.5 may be further divided based on whether the student has visited the educational institution. A first group of the subset of prospects may include prospects that have visited the educational institution. A second group of the subset of prospects may include prospects that have not visited the institution. An admission officer may now select, from the subset of students with GPAs between 3.0 and 3.5, the group of prospects that have visited the institution. Responsive to the further selection of prospects that have visited the institution, the recruiting interface 130 displays a list of prospects that both (a) have a GPA between 3.0 and 3.5 and (b) have visited the institution. An admission officer may now select individual prospects to check for notes regarding the prospect visit.

The pre-application prospect category view 204 may further display prospect category statistics 220. The prospect category statistics 220 may include a number of pre-application prospects in a particular category. As an example, the pre-application prospect category view 204 may display information about a category of pre-application prospects labeled "Students with 5 or more A's in high school." Responsive to detecting a user's mouse hovering over the category label, the prospect category view displays the text "562 prospects identified." Additionally, or alternatively, the prospect category statistics 220 may include percentiles or trends over time associated with a particular prospect category.

C. Individual Pre-Application Prospect View

Figure 2D:
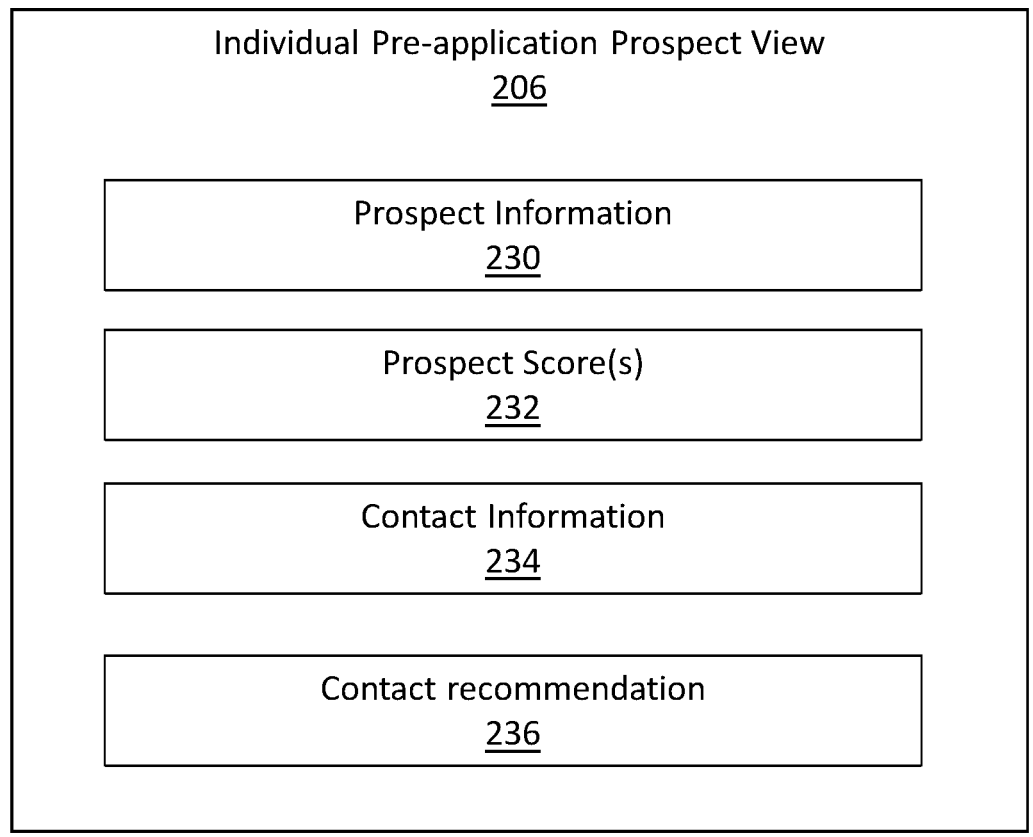
FIG. 2D illustrates an individual pre-application prospect view of a recruiting interface in accordance with one or more embodiments.

In response to user selection of a particular prospect from a set of prospects displayed in the pre-application prospect category view 204, the recruiting interface 130 may switch from the pre-application prospect category view 204 to an individual pre-application prospect view 206, as illustrated in FIG. 2D. The individual pre-application prospect view 206 may display additional information about an individual that may not necessarily have been displayed in the pre-application prospect category view 204.

In an embodiment, the individual pre-application prospect view 206 may display detailed information about a particular individual. As an example, the individual pre-application prospect view 206 may display a prospect's extra-curricular activities. Furthermore, the individual pre-application prospect view 206 may include links to external websites associated with a prospect. For example, the individual pre-application prospect view 206 may include a link to a prospect's social networking webpage or professional networking webpage.

In an embodiment, the prospect score(s) 232 are score(s) assigned to a prospect by the prospect analyzer. The individual pre-application prospect view 206 may display a score representing the prospect's likelihood of success at the educational institution. As an example, the individual pre-application prospect view 206 may display a score representing the prospect's likelihood of being admitted to the educational institution. As another example, the individual pre-application prospect view 206 may display a score representing the prospect's likelihood of graduating from the educational institution. Alternatively, or additionally, the individual pre-application prospect view 206 may display a score representing a likelihood of success based upon multiple factors such as likelihood of applying, likelihood of being admitted, and likelihood of obtaining employment.

In an embodiment, the individual pre-application prospect view 206 may display contact information 234 for a prospect. The individual pre-application prospect view 206 may display a prospect's mailing address, e-mail address, and/or phone number. The individual pre-application prospect view 206 may display a link to one or more social media pages associated with the prospect.

In an embodiment, the individual pre-application prospect view 206 may display a contact recommendation 236. The contact recommendation 236 may be a recommendation to contact a potential applicant. Alternatively, the contact recommendation 236 may be a recommendation to not contact a potential applicant. The contact recommendation 236 may be determined by the prospect analyzer, as further described in Section 5A.

In an embodiment, one or more views of the recruiting and admission system 100 may allow for interaction directly with a prospect. As an example, an appointment scheduling tool may include functionality to schedule an appointment with the prospect. An admission officer may schedule an interview with a prospect directly from within the admission interface. Alternatively, or additionally, the admission interface may be communicatively coupled with a calendaring application for scheduling meetings. Other functionality may include suggesting programs, such as extracurricular activities, that may improve a prospect's chance of acceptance by the university. A program may be suggested via an email, a text message, a chat message, or another form of communication configured for the recruiting and admission system 100.

4. Adaptive Admission Interface

FIGS. 3A-3D illustrate examples of an admission interface 140 in accordance with one or more embodiments. The admission interface 140 may be an adaptive admission interface. An adaptive admission interface is periodically or continuously adapted based on statistics about prior prospects that succeeded or did not succeed in the higher education institution. The admission interface 140 may display user-selected categories to separate applicants based on a likelihood of success, as estimated from statistics corresponding to prior prospects. Presentation of categories based on a likelihood of success allows for admission officers to focus on prospects that are most likely to succeed in the university.

Figure 3A:
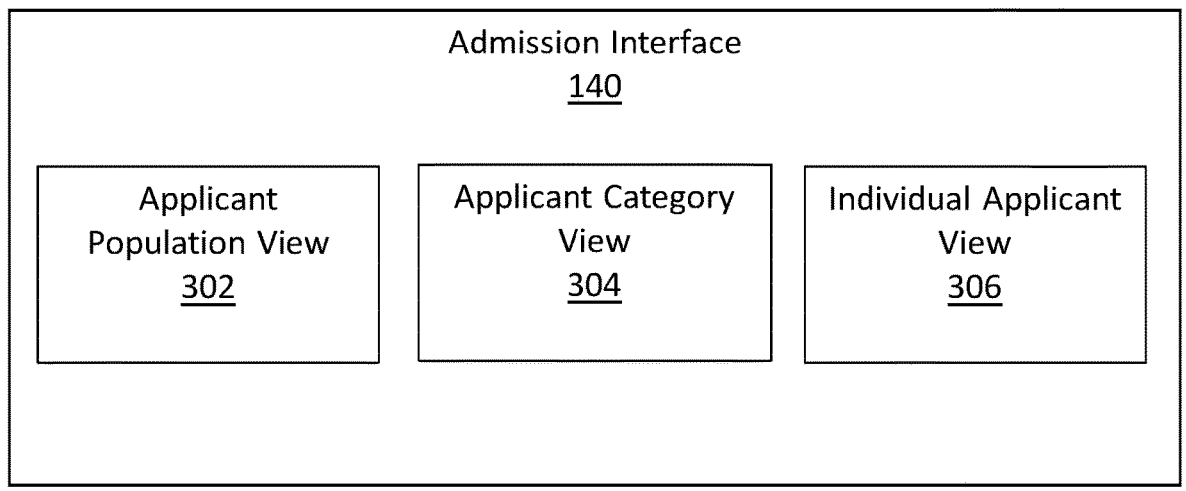
FIG. 3A illustrates an admission interface in accordance with one or more embodiments.

As illustrated in FIG. 3A, the admission interface 140 includes an applicant population view 302, an applicant category view 304, and an individual applicant view 306. The admission interface 140 may switch views, responsive to user input, to allow a user to drill down into statistics about a selected group of applicants.

A. Applicant Population View

Figure 3B:
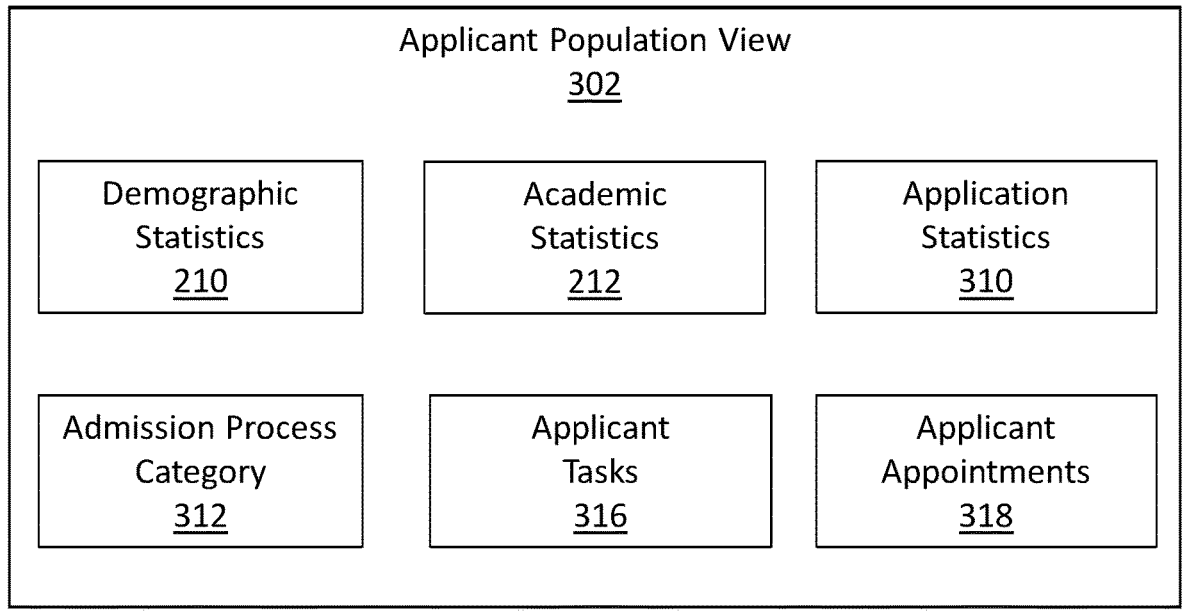
FIG. 3B illustrates an applicant population view of an admission interface in accordance with one or more embodiments.

As illustrated in FIG. 3B, an applicant population view 302 may include, for example, a display of aggregate information corresponding to prospects for which data is available in the prospect information repository. The aggregate information may include aggregate prospect information associated with each of a set of prospects. The applicant population view 302 may display information about an institution as a whole. As an example, the applicant population view 302 may display trends across years such as an average GPA, average age, or residence locations of prospects who graduated from the university in prior years.

The applicant population view 302 of the admission interface 140 may display categories of applicants. The applicant population view may display clickable links or buttons to enable a user to drill down and view a particular category of applicants. The categories may correspond to demographic statistics 210 and academic statistics 212, as described above in Section 3A. Additionally, the admission interface 140 may display statistics and/or categories related to application statistics 310, admission process categories 312, and/or applicant match levels 314.

In an embodiment, the application statistics 310 are statistics related to college applications received. The application statistics 310 may include a number of applications received. The application statistics 310 may include a number of applicants admitted in one or more previous years. Previous admits may further be organized based on additional categories. As an example, the applicant population view 302 may display the percentage of applicants admitted, in previous years, having a high school GPA lower than 3.0.

In an embodiment, an admission process category 312 may specify a set of prospects at a particular stage in the application process. As an example, the admission process category 312 may correspond to a set of prospects which have initiated, but not completed, an application. An admission process category 312 may correspond to a set of applicants which are missing particular application items (e.g., a test score report or a transcript). An admission process category 312 may correspond to applicants which have applied, but no admission decision has been made. An admission process category 312 may correspond to applicants which have applied, and an admission decision has been made.

In an embodiment, the applicant tasks 316 are activities to be performed by a user regarding one or more applicants. The applicant tasks 316 may be action items for an admission officer. The applicant tasks 316 may include processing an application and sending out an acceptance letter.

In an embodiment, the applicant appointments 318 are upcoming appointments for a user regarding one or more applicants. As an example, the applicant population view 302 may display upcoming appointments for an admission officer. The listed appointments may be integrated with links to methods of communication. An appointment with Chris Sanchez may be illustrated with a time of the appointment, a type of the appointment, a link to message Chris, a representation of Chris' application status, and a link to Chris' detailed profile.

B. Applicant Category View

Figure 3C:
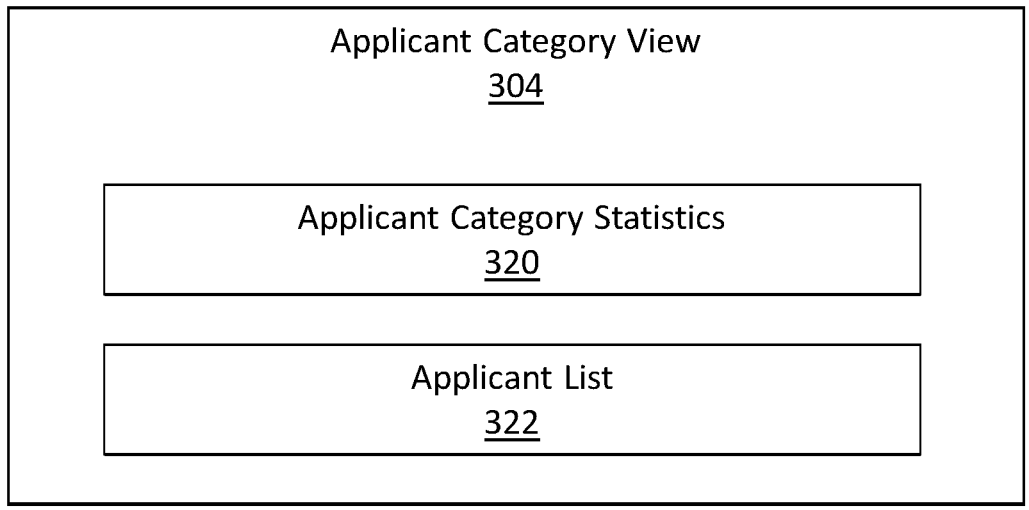
FIG. 3C illustrates an applicant category view of an admission interface in accordance with one or more embodiments.

Responsive to user input selecting a prospect category via the applicant population view 302, the admission interface 140 may present an applicant category view 304 as illustrated in FIG. 3C.

The applicant category view 304 may display an applicant list 322, which is list of applicants in a particular category. As an example, responsive to user selection of the category "Ethnicity=Native American," the system displays a list of 45 identified prospects which are known to be Native American. The applicant category view 304 may divide a selected subset of prospects into further groups, as described in Section 3B regarding the pre-application prospect category view 204.

The applicant category view 304 may further display applicant category statistics 320. The applicant category statistics 320 may include a number of applicants in a particular category. As an example, the applicant category view 304 may display information about a category of applicants labeled "Students with 5 or more A's in high school." Responsive to detecting a user's mouse hovering over the category label, the applicant category view 304 displays the text "562 applicants identified." Additionally, the applicant category statistics 320 may include percentiles or trends over time associated with a particular applicant category.

C. Individual Applicant View

Figure 3D:
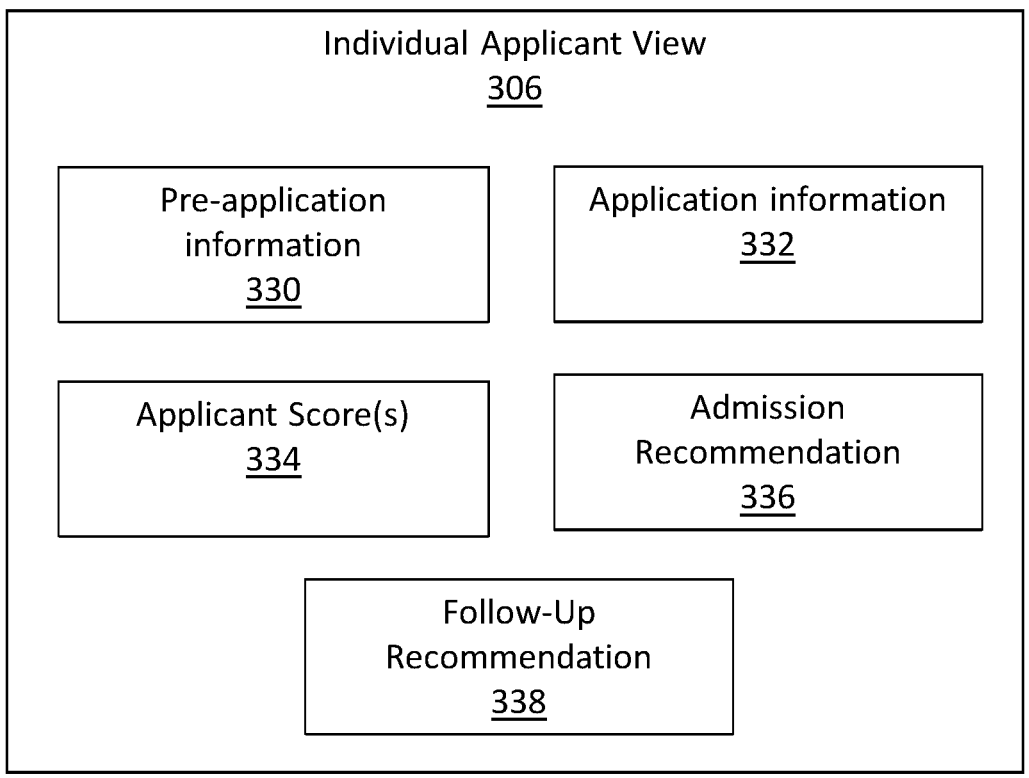
FIG. 3D illustrates an individual applicant view of an admission in accordance with one or more embodiments.

In response to selection of a particular prospect from a set of prospects displayed in the applicant category view 304, the admission interface 140 may switch from the applicant category view 304 to an individual applicant view 306, as illustrated in FIG. 3D. The individual applicant view 306 may display additional information about an individual that may not necessarily have been displayed in the applicant category view 304.

In an embodiment, the individual applicant view 306 may display detailed information about a particular individual, including pre-application information 330. Pre-application information may include information gathered at the recruiting phase, such as test scores and high school grades. As an example, the individual applicant view 306 may display a prospect's high school extra-curricular activities. Furthermore, the individual applicant view 306 may include links to external websites associated with a prospect. For example, the individual applicant view 306 may include a link to a prospect's social networking webpage or professional networking webpage.

In an embodiment, the individual applicant view 306 may include application information 332. Application information 332 is information obtained from an admission application. Application information 332 may include information provided in an essay. Application information 332 may include information provided in a letter of recommendation.

In an embodiment, the individual applicant view 306 may include applicant score(s) 334. The applicant score(s) 334 are score(s) assigned to an applicant by the prospect analyzer. The individual applicant view 306 may display a score representing the prospect's likelihood of success at the educational institution. As an example, the individual applicant view 306 may display a score representing the applicant's likelihood of enrolling in the educational institution. As another example, individual applicant view 306 may display a score representing the applicant's likelihood of graduating from the educational institution. Alternatively, or additionally, the individual applicant view 306 may display a score derived based on multiple factors such as likelihood of enrolling, likelihood of graduating, and likelihood of obtaining employment.

In an embodiment, the individual applicant view 306 may display an admission recommendation 336. The admission recommendation 336 may be a recommendation to admit, or not admit, a particular applicant. The admission recommendation 336 may be determined by the prospect analyzer, as further described in Section 5A.

In an embodiment, the individual applicant view 306 may display a follow-up recommendation 338. The follow-up recommendation 338 may be based on missing information in an applicant's application materials. As an example, an applicant may have started an application, but still need to provide test scores or a letter of recommendation. The system may identify missing information and notify a user to reach out to the applicant to request the missing information. Alternatively, or additionally, the system may directly transmit a reminder to the applicant.

5. Identifying and Presenting Prospects

A. Based on Recommendation

Figure 4:
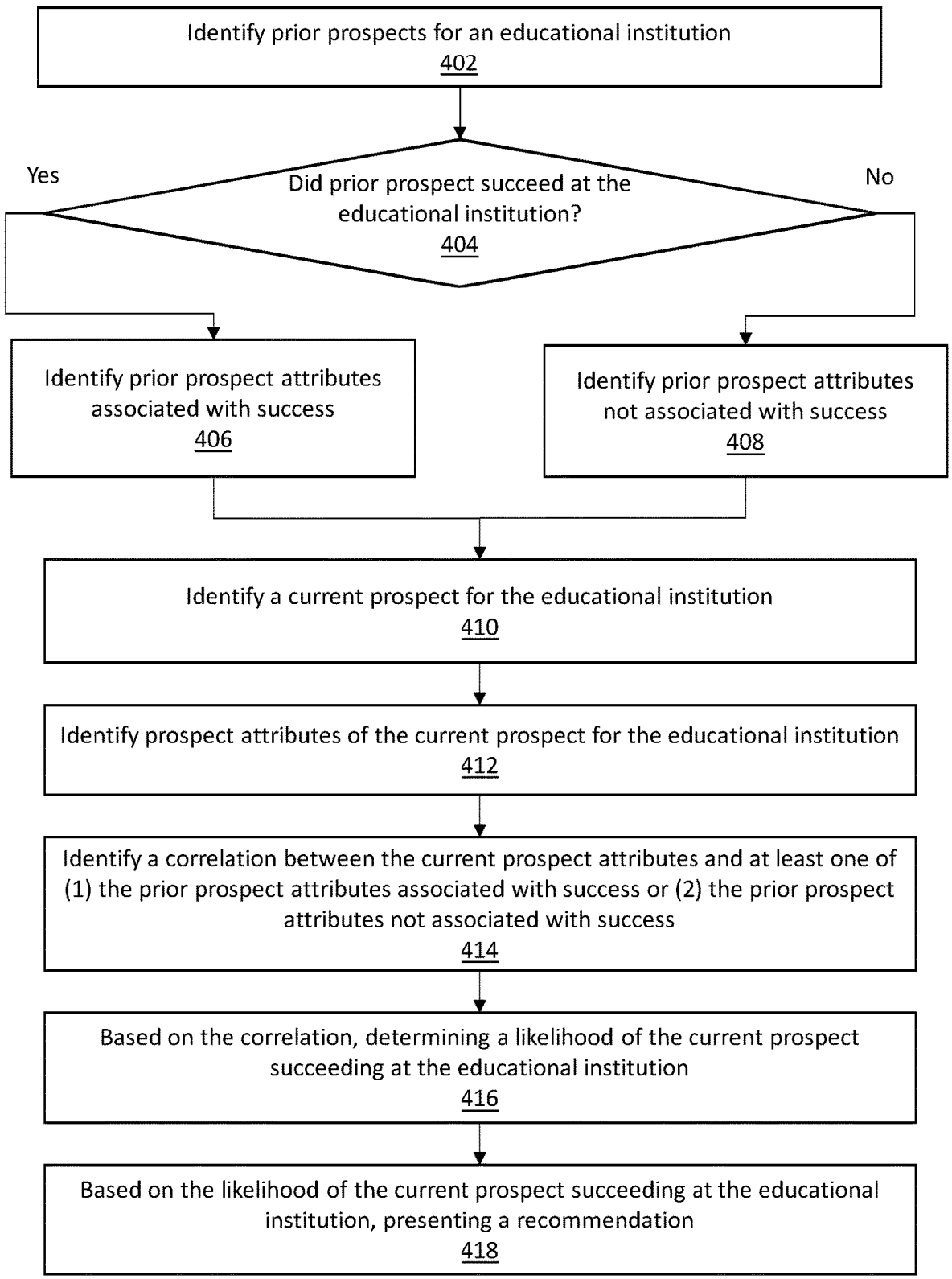
FIG. 4 illustrates an example set of operations for identifying and presenting a recommended prospect in accordance with one or more embodiments.

FIG. 4 illustrates an example set of operations for identifying and presenting recommended prospects in accordance with one or more embodiments. One or more operations illustrated in FIG. 4 may be modified, rearranged, or omitted altogether. Accordingly, the particular sequence of operations illustrated in FIG. 4 should not be construed as limiting the scope of one or more embodiments.

In an embodiment, the prospect analyzer identifies prior prospects for an educational institution. (Operation 402). The prospect analyzer may identify all prior prospects for which prior prospect statistics are available. Alternatively, the prospect analyzer may identify a subset of prior prospects. As an example, responsive to user selection of the prospect category: "Citizenship=China," the prospect analyzer identifies a subset of prior prospects having Chinese citizenship.

In an embodiment, the prospect analyzer determines whether a prior prospect succeeded at the educational institution. (Operation 404). Success may be defined by one of many metrics, such as graduating from, or enrolling in, the educational institution, as described in Section 2. A metric of success may be selected via user input to the recruiting interface 130 and/or the admission interface 140. As an example, an admission officer selects a success metric, graduating within 5 years, which is then used by the system to evaluate prospects. The prospect analyzer may use one, or many, success metrics to evaluate the prospects.

Based on the appropriate success metric(s), the prospect analyzer determines whether a particular prospect succeeded. As an example, the success metric is graduating within 5 years, and a particular prospect graduated in 3 years. The prospect analyzer compares the graduation timeframe of the particular prior prospect to the success metric to determine that the particular prospect succeeded.

The prospect analyzer may identify a subset of prior prospects that succeeded. As an example, the prospect analyzer may identify 1,000 prior prospects who graduated from the educational institution in 5 or fewer years.

In an embodiment, the prospect analyzer identifies prior prospect attributes associated with success. (Operation 406). The prospect analyzer may identify attributes that are frequently associated with prior prospects that succeeded. As an example, the prospect analyzer may determine that students with high-school GPAs greater than or equal to 3.4 historically have an 85% chance of graduating from the university. Accordingly, "GPA ≥3.4" is identified as a prior prospect attribute associated with success. As another example, the prospect analyzer may identify statistical patterns across a plurality of attributes.

In an embodiment, the prospect analyzer identifies prior prospect attributes not associated with success. (Operation 408). The prospect analyzer may identify attributes that frequently are associated with prior prospects that did not succeed. As an example, the prospect analyzer may determine that students with high-school GPAs less than or equal to 2.1 historically have a 70% chance of dropping out of the university. Accordingly, "GPA ≤2.1" is identified as a prior prospect attribute which is not associated with success.

In an embodiment, the prospect analyzer identifies a current prospect for the educational institution. (Operation 410). The prospect analyzer may identify a current prospect responsive to detecting user input to the recruiting interface. As an example, a recruiter selects a particular prospect for analysis via the recruiting interface. The prospect analyzer may identify a current prospect responsive to detecting user input to the admission interface. As an example, an admission officer selects a particular prospect for analysis via the admission interface. Alternatively, or additionally, the prospect analyzer may identify a current prospect responsive to new data being updated to the prospect information repository. As an example, the prospect information repository is updated with new data upon receiving a new application. In response to detecting the new data, the prospect analyzer begins to analyze the new applicant.

In an embodiment, the prospect analyzer identifies prospect attributes of the current prospect for the educational institution (Operation 412). The prospect analyzer may identify prospect attributes stored in the prospect information repository. The prospect analyzer may query the prospect information repository to retrieve a particular prospect attribute for the current prospect. Alternatively, the prospect analyzer may retrieve all prospect attributes available for the current prospect.

In an embodiment, the prospect analyzer identifies a correlation between the current prospect attributes and at least one of (1) the prior prospect attributes associated with success or (2) the prior prospect attributes not associated with success (Operation 414). As an example, the prospect analyzer may determine a number of attributes shared between prior prospects associated with success and the current prospect. Alternatively, or additionally, the prospect analyzer may determine a number of attributes shared between prior prospects not associated with success and the current prospect.

In an embodiment, the prospect analyzer determines a likelihood of the current prospect succeeding at the educational institution (Operation 416). The determination is based on the correlation(s) between the prior prospects and the current prospect. As an example, 10 attributes are known for a current prospect. Eight of the attributes are shared with prior prospects that succeeded. Two attributes are shared with prior prospects that did not succeed. Accordingly, the prospect analyzer determines that the current prospect is likely to succeed. The determination is based both on (1) the relatively high correlation between current prospect attributes and prior prospect attributes associated with success and (2) the relatively low correlation between current prospect attributes and prior prospect attributes not associated with success. The prospect analyzer may determine a success score based on the correlation. As an example, the prospect analyzer assigns +1 point for every attribute shared with prior prospects associated with success. The prospect analyzer assigns −0.5 points for every attribute shared with prior prospects not associated with success. The prospect analyzer aggregates the points, for the current prospect, to arrive at a success score for the current prospect.

In one or more embodiments, the prospect analyzer uses one or more machine-learning models to predict the current's prospect's likelihood of success based on the prospect attributes. As an example, the prospect analyzer may train a machine-learning model, using the prior prospect statistics, to generate a success model as a function of multiple prospect attributes. Using the machine-learning model, the prospect analyzer may identify a subset of prior prospect attributes which are relevant to the success determination. The machine-learning model may weight each of the attributes in order of each attribute's pertinence to the success determination. The prospect analyzer may input the current prospect attributes into the model, to arrive at a success score for the current attribute. The success score may be numerical (e.g., a scale from 1 to 100).

In an embodiment, the machine-learning model(s) may be adapted based on user input or refreshed data sets. Responsive to user selection of a category, the system may fine-tune the model(s) implemented. As an example, a user selects the category "transfer students." The system refines the model(s) to apply to transfer students. The system may update the model(s) as data is refreshed. As an example, the system processes a set of alumni surveys, updating the stored prior prospect data. Accordingly, the system refreshes the model(s) based on the updated data set. Additionally, or alternatively, the model(s) may be updated based on lift analysis. As an example, after two years of targeting prospects from Alabama, data shows that university revenue increased by 15%. Accordingly, the model(s) are refreshed to more heavily favor prospects from Alabama.

In an embodiment, the system presents a recommendation. (Operation 418). The system presents the recommendation based on the determined likelihood of the current prospect succeeding at the educational institution. As an example, prospects with a success score greater than 60 are recommended, while prospects with a success score less than or equal to 60 are not recommended. The system may recommend that a pre-application prospect be contacted directly and/or sent marketing materials. The system may recommend that an applicant be admitted or not admitted to the educational institution. A recommendation whether to contact a pre-application prospect may be presented via the recruiting interface. A recommendation whether to admit an applicant may be presented via the admission interface.

The following detailed example illustrates operations in accordance with one or more embodiments. The following detailed example should not be construed as limiting the scope of any of the claims. The recruiting and admission system prepares to identify prospects to recruit to apply to a university's medical school. The system identifies the university's institutional preferences. To be admitted to the university's medical school, prospects must have completed an undergraduate degree in biology, chemistry, or pre-medicine. Additionally, the university is seeking prospects that are underrepresented minorities.

The system identifies data corresponding to a large set of prior prospects who have interacted with the university. Using the data corresponding to the prior prospects, the system uses a machine-learning model to correlate prior prospect attributes with success. The system evaluates success based on a combination of several success metrics: applying to the university, gaining admission to the university, graduating, and being employed as a doctor after graduating.

Attributes such as grades, extracurricular activities, and age are weighted based on a correlation with each of the success metrics. The machine-learning model is fine-tuned based on the institutional preferences-only students working towards or holding a degree in biology, chemistry, or pre-medicine are selected. The model is further fine-tuned to give a boost to prospects identifying as underrepresented minorities.

The system identifies a current prospect, Jane Doe. Jane Doe has visited the university and spoken to a recruiter at the medical school, but has not yet applied (i.e., Jane Doe is a pre-application prospect). The system has gathered prospect data about Jane Doe, including undergraduate grades, major, and demographic information. The system inputs prospect data corresponding to Jane Doe into the machine-learning model. The output of the model is a score from 1 to 100 indicative of Jane Doe's likelihood of succeeding at the university. Jane Doe is assigned a score of 90, indicting a high likelihood of success and a good fit to the university's institutional preferences.

Based on the high likelihood of Jane Doe succeeding at the university's medical school, the system presents a recommendation to contact Jane Doe. The recruiting interface displays detailed information about Jane Doe. Alongside the detailed information about Jane Doe, the recruiting interface prominently displays the text "Contact Recommended." The recruiting interface displays buttons enabling a user to directly contact Jane Doe via the recruiting interface.

B. Based on Category

Figure 5:
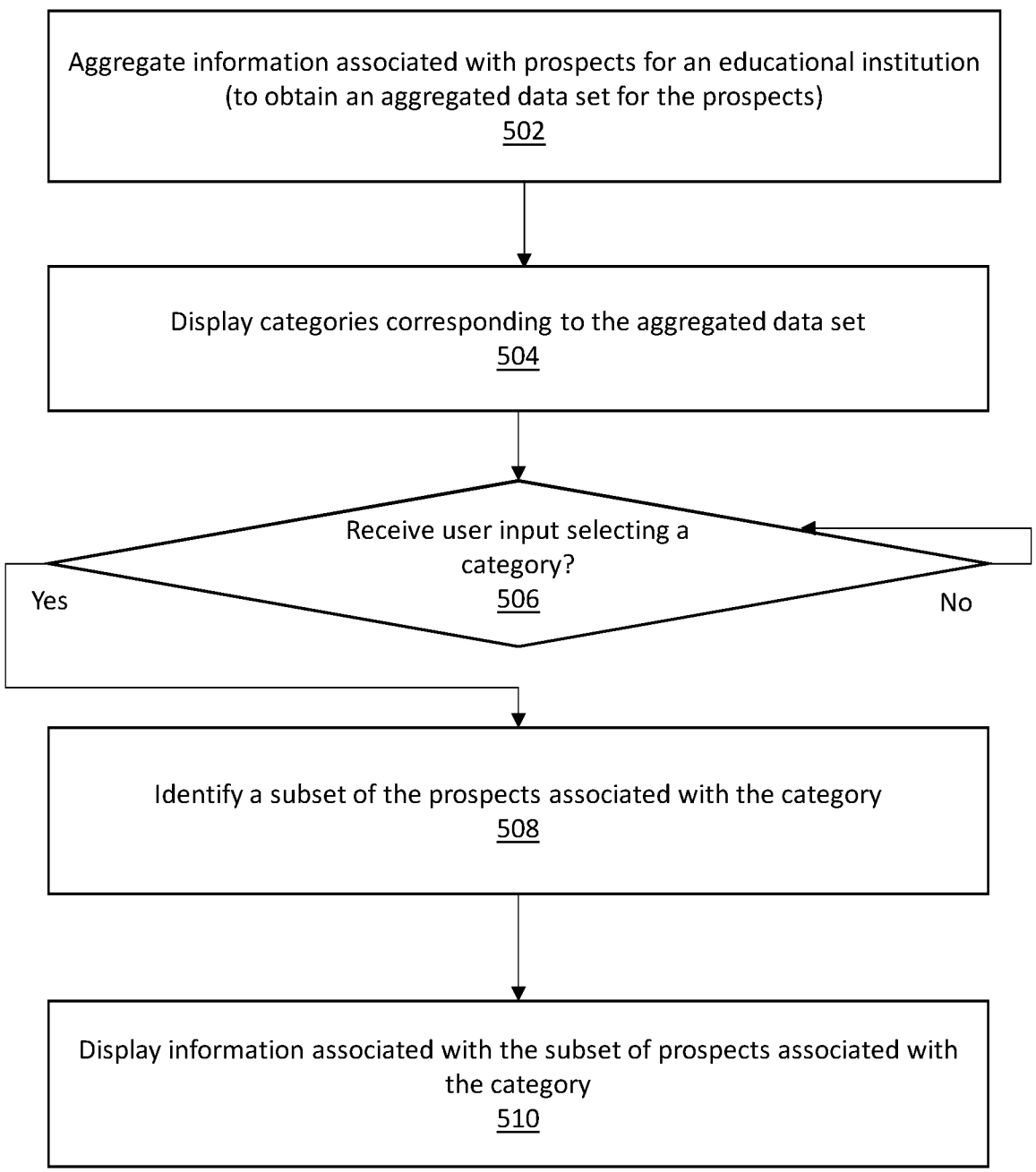
FIG. 5 illustrates an example set of operations for displaying prospect information based on a category in accordance with one or more embodiments.

FIG. 5 illustrates an example set of operations for displaying information associated with a subset of prospects associated with one or more categories in accordance with one or more embodiments. One or more operations illustrated in FIG. 5 may be modified, rearranged, or omitted altogether. Accordingly, the particular sequence of operations illustrated in FIG. 5 should not be construed as limiting the scope of one or more embodiments.

In an embodiment, the recruiting and admission system aggregates information associated with prospects for an educational institution (Operation 502). The system aggregates the information associated with a plurality of current prospects to obtain an aggregated data set for the prospects. The system may aggregate data from many sources, such as recruiting process data, personal data, academic data, and/or application data. The prospect data processor may normalize the data to facilitate comparison of data from different sources and formats. The prospect data processor may derive new data which is useful in analyzing a prospect. As an example, the prospect data processor generates a combined SAT and American College Testing (ACT) score to store for each prospect for whom both scores are available. The processed data set is stored to the prospect information repository.

In an embodiment, the recruiting and admission system displays categories corresponding to the aggregated data set (Operation 504). In the case of pre-application prospects being assessed for recruiting purposes, the pre-application prospect population view of the recruiting interface (shown in FIG. 2B) may display the categories. In the case of applicants being assessed for admission, the applicant population view of the admission interface (shown in FIG. 3B) may display the categories. The categories may be displayed as buttons or links which may be selected by a user.

In an embodiment, the system receives user input selecting a category (Operation 506). A user may click a link or button displayed on the recruiting interface or admission interface. Responsive to receiving the user input, the corresponding interface identifies a selected category.

In an embodiment, the prospect analyzer identifies a subset of the prospects associated with the category. (Operation 508). The prospect analyzer may query the prospect information repository to identify prospects associated with the category. As an example, the category is "Graduate Record Exam (GRE) Verbal score >160." The prospect analyzer queries the prospect information repository to retrieve a list of current prospects with GRE verbal scores exceeding 160.

In an embodiment, the system displays information associated with the subset of prospects associated with the category. (Operation 510). For pre-application prospects, the subset of prospects associated with the category may be displayed via the pre-application prospect category view of the recruiting interface (as shown in FIG. 2C). For applicants, the subset of prospects associated with the category may be displayed via the applicant category view of the applicant interface (as shown in FIG. 3C). In either case, the system may display a list of prospects and/or statistics about the prospects in the category as a whole.

The following detailed example illustrates operations in accordance with one or more embodiments. The following detailed example should not be construed as limiting the scope of any of the claims. A university admission officer opens the admission interface. The admission officer has become aware of a university-wide effort to increase the diversity of admitted students. In particular, there is a need for students that would be the first in the student's family to attend college.

The recruiting and admission system has accumulated data for thousands of applicants. The data is stored to the prospect information repository. The set of prospect attributes available for each of the students varies. Some students have reported SAT scores, while others have not reported SAT scores. Some prospects have reported race, while others have not reported race. For some students, the system has acquired internet browsing data indicating interests and desires. For other students, browsing data was not available. Thirty percent of applicants have provided information about whether the student has no immediate family members that have attended college, in an optional portion of the admission application. In some cases, a student focused a personal statement on a hope to be the first in the student's family to attend college.

The admission officer opens the applicant population view of the admission interface. The applicant population view displays numerous types of categories including demographic statistics, academic statistics, and application statistics. The admission officer selects a category-"First in Family to Attend College." The admission officer clicks on a button on the interface corresponding to the category. Responsive to the user input, the system identifies each prospect in the "First in Family to Attend College" category.

The admission interface transitions to the applicant category view. The interface displays a list of applicants in the "First in Family to Attend College" category. The admission interface displays additional categories. The admission officer fine-tunes the list of applicants using the additional categories. The admission officer clicks on the category "GPA >3.2." The system refines the list of students to display students with GPAs greater than 3.2. The officer clicks on the category "SAT >1200. The system refines the list of students to display the students with SAT scores greater than 1200. Now the admission interface displays a manageable list of 30 applicants which are likely desirable to the university. The admission officer clicks on each applicant in the list, in turn. The system displays detailed information about an applicant via the individual applicant view of the applicant interface. The admission officer views detailed information about each applicant, including an admission recommendation.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 360 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a plurality of prior prospects of an educational institution;
   training a machine learning model based on statistics of the plurality of prior prospects to generate a machine learning model that computes success scores for current prospects of the educational institution as a function of a plurality of prospect attributes;
   using the trained machine learning model to identify:
      a first subset of the plurality of prospect attributes as relevant to success determination, the first subset of prospect attributes being associated with succeeding at the educational institution; and
      a second subset of the plurality of prospect attributes as relevant to success determination, the second subset of prospect attributes being associated with not succeeding at the educational institution;
   identifying a first correlation value between (a) attributes of a current prospect and (b) the first subset of prospect attributes being associated with succeeding at the education institution;
   identifying a second correlation value between (a) the attributes of the current prospect and (b) the second subset of prospect attributes being associated with not succeeding at the educational institution;
   based on both the first correlation value and the second correlation value, determining a likelihood of the current prospect succeeding at the educational institution; and
   presenting a recommendation for the current prospect based on the likelihood of the current prospect succeeding at the educational institution.

2. The medium of claim 1, wherein the operations further comprise traversing one or more databases to identify one or more of the current prospects for the educational institution prior to any communication from the one or more current prospects to the educational institution.

3. The medium of claim 1, wherein the recommendation comprises one of:
   a recommendation to admit a particular current prospect; or
   a recommendation to not admit a particular current prospect.

4. The medium of claim 1, wherein the recommendation comprises one of:
   a recommendation to contact or not contact a particular current prospect to initiate an application process for applying to the educational institution.

5. The medium of claim 1, wherein the first subset of prospect attributes associated with succeeding at the educational institution comprises one or more of: enrolling in the educational institution, graduating from the educational institution, graduating from the educational institution within a threshold time period, or obtaining employment subsequent to graduating from the educational institution.

6. The medium of claim 1, wherein at least one of the current prospects comprise an applicant to the educational institution.

7. The medium of claim 1, wherein the likelihood of a particular current prospect succeeding in the educational institution comprises a success score representing a likelihood of the particular current prospect succeeding in the educational institution.

8. The medium of claim 1, wherein the likelihood of a particular current prospect succeeding in the educational institution is determined based on industry employment data.

9. The medium of claim 1, wherein the likelihood of a particular current prospect succeeding in the educational institution is determined based on institutional information.

10. The medium of claim 1, wherein the likelihood of a particular current prospect succeeding in the educational institution is determined based on personal data.

11. The medium of claim 1, wherein:

the operations further comprise traversing one or more databases to identify one or more of the current prospects of the plurality of current prospects for the educational institution prior to any communication from the one or more current prospects to the educational institution;

the recommendation comprises one or more of: a recommendation to admit a particular current prospect, a recommendation to not admit the particular current prospect, a recommendation to contact the particular current prospect to initiate an application process for applying to the educational institution, or a recommendation to not contact the particular current prospect to initiate an application process for applying to the educational institution;

the first subset of prospect attributes associated with succeeding in the educational institution comprises one or more of: enrolling in the educational institution, graduating from the educational institution, graduating from the educational institution within a threshold time period, or obtaining employment subsequent to graduating from the educational institution;

the likelihood of the particular current prospect succeeding in the educational institution comprises a success score representing the likelihood of the particular prospect succeeding in the educational institution; and the likelihood of the particular current prospect succeeding in the educational institution is determined based on one or more of: industry employment data, institutional preferences, institutional information, or personal data.

12. The medium of claim 1, wherein:

the first correlation value is based on a first number of attributes associated with succeeding at the educational institution shared between the current prospect and the first subset of the plurality of prospect attributes; and the second correlation value is based on a second number of attributes associated with not succeeding at the educational institution shared between the current prospect and the second subset of the plurality of prospect attributes.

13. A method comprising:

identifying a plurality of prior prospects of an educational institution;

training a machine learning model based on statistics of the plurality of prior prospects to generate a machine learning model that computes success scores for current prospects of the educational institution as a function of a plurality of prospect attributes;

using the trained machine learning model to identify:
a first subset of the plurality of prospect attributes as relevant to success determination, the first subset of prospect attributes being associated with succeeding at shared by the prior prospects associated with increased revenue of the educational institution; and
a second subset of the plurality of prospect attributes as relevant to success determination, the second subset of prospect attributes being associated with not succeeding at the educational institution;

identifying a first correlation value between (a) attributes of a current prospect and (b) the first subset of prospect attributes being associated with succeeding at the education institution;

identifying a second correlation value between (a) the attributes of the current prospect and (b) the second subset of prospect attributes being associated with not succeeding at the educational institution;

based on both the first correlation value and the second correlation value, determining a likelihood of the current prospect succeeding at the educational institution; and presenting a recommendation for the current prospect based on the likelihood of the current prospect succeeding at the educational institution;

wherein the method is performed by at least one device including a hardware processor.

14. The medium of claim 12, wherein:

the first correlation value is calculated by summing a first unit for each of the first number of shared attributes;

the second correlation value is calculated by summing a second unit smaller than the first unit for each of the second number of shared attributes; and the likelihood of the current prospect succeeding at the educational institution is proportional to an aggregate value generated by subtracting the second correlation value from the first correlation value.

15. A system comprising:

at least one hardware processor;

the system being configured to execute operations using the at least one hardware processor to perform operations comprising:

identifying a plurality of prior prospects of an educational institution;

training a machine learning model based on statistics of the plurality of prior prospects to generate a machine learning model that computes success scores for current prospects of the educational institution as a function of a plurality of prospect attributes;

using the trained machine learning model to identify:
a first subset of the plurality of prospect attributes as relevant to success determination, the first subset of prospect attributes being associated with succeeding at the educational institution; and
a second subset of the plurality of prospect attributes as relevant to success determination, the second subset of prospect attributes being associated with not succeeding at the educational institution;

identifying a first correlation value between (a) attributes of a current prospect and (b) the first subset of prospect attributes being associated with succeeding at the education institution;

identifying a second correlation value between (a) the attributes of the current prospect and (b) the second subset of prospect attributes being associated with not succeeding at the educational institution;

based on both the first correlation value and the second correlation value, determining a likelihood of the current prospect succeeding at the educational institution; and presenting a recommendation for the current prospect based on the likelihood of the current prospect succeeding at the educational institution.

* * * * *

UNITED STATES PATENT AND TRADEMARK OFFICE
CERTIFICATE OF CORRECTION

PATENT NO. : 11,301,945 B2
APPLICATION NO. : 15/915361
DATED : April 12, 2022
INVENTOR(S) : Terra et al.

It is certified that error appears in the above-identified patent and that said Letters Patent is hereby corrected as shown below:

In the Claims

In Column 23, Lines 3-4, in Claim 11, after "prospects" delete "of the plurality of current prospects", therefor.

In Column 23, Lines 53-55, in Claim 13, after "succeeding at" delete "shared by the prior prospects associated with increased revenue of", therefor.

Signed and Sealed this
Sixteenth Day of August, 2022

Katherine Kelly Vidal
*Director of the United States Patent and Trademark Office*